United States Patent [19]

Kurihara et al.

[11] Patent Number: 5,344,659
[45] Date of Patent: Sep. 6, 1994

[54] CHEWING GUM

[75] Inventors: Yoshie Kurihara; Hiroshige Kohno; Hiromu Sugiyama; Teiyu Shimada; Masako Saito; Kenji Ikeda, all of Tokyo, Japan

[73] Assignees: Yoshie Kurihara; Asahi Denka Kogyo Kabushiki Kaisha, both of Tokyo, Japan

[21] Appl. No.: 127,413

[22] Filed: Sep. 27, 1993

Related U.S. Application Data

[63] Continuation of Ser. No. 916,592, Jul. 20, 1992, abandoned.

[30] Foreign Application Priority Data

Aug. 2, 1991 [JP] Japan .................................. 3-194516

[51] Int. Cl.$^5$ .............................................. A23G 3/30
[52] U.S. Cl. .......................................... 426/3; 426/96; 426/99
[58] Field of Search ................................ 426/3, 96, 99

[56] References Cited

U.S. PATENT DOCUMENTS

| | | | |
|---|---|---|---|
| 4,711,784 | 12/1987 | Yang | 426/99 X |
| 4,752,485 | 6/1988 | Sharma et al. | 426/99 |
| 4,885,175 | 12/1989 | Zibell | 426/99 X |
| 4,978,537 | 12/1990 | Song | 426/99 X |
| 5,116,627 | 5/1992 | Rutherford | 426/96 X |
| 5,126,151 | 6/1992 | Bodor | 426/99 |

FOREIGN PATENT DOCUMENTS

| | | |
|---|---|---|
| 0067595 | 12/1982 | European Pat. Off. . |
| 0343775 | 11/1989 | European Pat. Off. . |
| 0351566 | 1/1990 | European Pat. Off. . |
| 3-190899 | 8/1991 | Japan . |

*Primary Examiner*—Joseph Golian
*Attorney, Agent, or Firm*—Frishauf, Holtz, Goodman & Woodward

[57] ABSTRACT

The chewing gum of the present invention contains a coated material prepared by coating *Curculigo latifolia* fruits, processed *Curculigo latifolia* fruits or a component containing curculin obtained therefrom with a coating agent.

1 Claim, No Drawings

CHEWING GUM

This application is a Continuation of application Ser. No. 07/916,592, filed Jul. 20, 1992 (abandoned).

BACKGROUND OF THE INVENTION

1. Field of the Invention

This invention relates to a chewing gum capable of stably retaining its flavor and sweetness for a prolonged period of time.

2. Description of the Prior Art

In the case of a common chewing gum, which essentially consists of three components, namely, a gum base, sugars and flavors, the flavors and sweeteners are released within a short period of time after starting chewing. It is, therefore, difficult to retain the flavor and sweetness for a prolonged period of time.

On the other hand, the present inventors formerly developed a method for the application of *Curculigo latifolia* fruits, dried *Curculigo latifolia* fruits or a component containing curculin obtained therefrom to chewing gum (refer to Japanese Patent Laid-Open No. 84138/1990).

SUMMARY OF THE INVENTION

As described in the Japanese Patent Laid-Open No. 84138/1990, when *Curculigo latifolia* fruits, dried *Curculigo latifolia* fruits or a component containing curculin obtained therefrom is directly mixed with a gum base and other components by a known method, it is necessary to add a considerably large amount of the same in order to achieve detectable effects of enhancing and retaining the flavor and sweetness. This is because the main constituents of the *Curculigo latifolia* fruits, dried *Curculigo latifolia* fruits or component containing curculin obtained therefrom are incorporated into the gum base and, as a result, the effects of enhancing and retaining the flavor and sweetness would be masked by the gum base.

Accordingly, it is an object of the present invention to provide a chewing gum which can stably retain the flavor and sweetness for a prolonged period of time and exert a sweetness-modification effect on water or a sour substance taken after chewing the same.

In the present invention, the above-mentioned object has been achieved by providing a chewing gum which contains a coated material prepared by coating *Curculigo latifolia* fruits, processed *Curculigo latifolia* fruits or a component containing curculin obtained therefrom with a coating agent.

The chewing gum according to the present invention stably retains its flavor and sweetness for a prolonged period of time, exerts a sweetness-modification effect on water or a sour substance taken after chewing the same, and has a good texture at chewing.

DETAILED DESCRIPTION OF THE INVENTION

Now the chewing gum of the present invention will be described in greater detail.

The *Curculigo latifolia* fruits, processed *Curculigo latifolia* fruits or a component containing curculin obtained therefrom are as follows.

As the above-mentioned *Curculigo latifolia* fruits or processed *Curculigo latifolia* fruits, fresh *Curculigo latifolia* fruits and processed ones (for example, grinds of dried or frozen *Curculigo latifolia* fruits or *Curculigo latifolia* sarcocarp puree) may be cited. It is preferable to use *Curculigo latifolia* fruits free from peels and seeds, since no curculin is contained in peels or seeds.

In the present invention, the method for drying *Curculigo latifolia* fruits is not particularly restricted. It is recommended, however, to conduct drying in the shade, cold-drying, freeze-drying, vacuum drying or drying in a relatively low temperature range therefor.

In the present invention, the method for freezing the above-mentioned *Curculigo latifolia* fruits is not particularly restricted. As the method therefor, slow freezing, rapid freezing and self-freezing may be cited.

In the present invention, the method for grinding the above-mentioned *Curculigo latifolia* fruits is not particularly restricted. It is undesirable, however, to ground seeds distributed in the sarcocarp, since these seeds are rich in oily components.

An example of the component containing curculin obtained from *Curculigo latifolia* fruits or processed *Curculigo latifolia* fruits is a salt-extracted curculin, which may be further purified by, for example, desalting.

As the component containing curculin to be used in the present invention, the salt-extracted curculin may be used either as such or after being purified by, for example, desalting. Alternately, a preparation thereof or an aqueous solution of the preparation may be employed therefor.

The extraction with a salt may be carried out in accordance with the method described in Japanese Patent Laid-Open No. 190899/1991 by washing *Curculigo latifolia* fruits or processed *Curculigo latifolia* fruits with water to thereby obtain a precipitate and sequentially by extracting the precipitate with an aqueous solution of a salt of a concentration of 0.01 M or above.

In the water-washing step, water is added to *Curculigo latifolia* fruits or the sarcocarp and the mixture is then homogenized and centrifuged. The supernatant thus obtained has a dark brown color. To the precipitate thus formed is added water in an amount as large as, or more than, the starting fruits or sarcocarp, followed by homogenizing and centrifuging. This water-washing operation is repeated until a colorless supernatant is obtained.

Examples of the salt usable in the extraction include hydrochlorides of sodium, potassium, calcium, magnesium and ammonium, phosphates of sodium, potassium, calcium, magnesium and ammonium, carbonates of sodium, potassium, calcium, magnesium and ammonium, sulfates and sulfites of sodium, potassium, calcium, magnesium and ammonium, nitrates and nitrites of sodium and potassium, lactates of sodium and calcium, alum, burnt alum, sodium acetate, pyrophosphates of sodium and potassium, propionates of sodium and potassium, sodium benzoate, sodium fumarate and polysodium acrylate.

The extraction with an aqueous salt solution may be carried out, for example, as follows. To the precipitate obtained in the above-mentioned water-washing step is added an aqueous solution of sodium chloride, followed by homogenizing and centrifuging or filtering.

The salt-extracted curculin thus obtained may be purified by a common procedure such as concentration, desalting, salting-out or chromatography.

In the present invention, the method for concentration is not particularly restricted. Thus it may be performed with the use of, for example, an ultrafiltration membrane.

Although the method for desalting to be used in the present invention is not particularly restricted, it may be preferably effected with the use of, for example, a dialysis membrane, an ultrafiltration membrane or a desalting device. The desalting may be preferably continued at least until the component containing curculin shows no saltiness.

Salting-out may be effected with the use of, for example, ammonium sulfate, sodium sulfate, potassium phosphate, magnesium sulfate, sodium citrate or sodium chloride. Chromatographic purification may be performed by, for example, ion exchange chromatography with CM-Sepharose or molecular sieve chromatography.

The term "coating" as used in the present invention refers to the covering or enclosing the *Curculigo latifolia* fruits, processed *Curculigo latifolia* fruits or component containing curculin obtained therefrom with other substances which will be described below.

In the present invention, the coating method is not particularly restricted. Examples of coating agents usable in the present invention include reducing maltose syrup, reducing starch decomposition product, lactose, various oligo-saccharides, dextrin, branched dextrin, whey protein, vegetable fats and oils, animal fats and oils, gelatin, guar gum, cyclodextrin, chitin, chitosan, soluble starch, gum arabic, pectin and microcrystalline cellulose, though the present invention is not restricted thereto.

In the present invention, the coating is performed in the following manner.

First, the *Curculigo latifolia* fruits, processed *Curculigo latifolia* fruits or component containing curculin obtained therefrom are mixed with a coating agent and then dissolved, dispersed or suspended in water or a saline to be used in the extraction. Next, the solution or suspension thus obtained is dried and ground. Thus a coated curculin composition is obtained.

It is preferable to use the water or salt in the above process at a temperature of 60° C. or below, since the activity of curculin is lowered in water at an excessively high temperature.

When the *Curculigo latifolia* fruits, processed *Curculigo latifolia* fruits or component containing curculin obtained therefrom are in the form of a liquid, the coating agent is added thereto, followed by treating in the same manner as the one described above. Thus a coated curculin composition is obtained.

In this stage, the weight ratio of the *Curculigo latifolia* fruits, processed *Curculigo latifolia* fruits or component containing curculin obtained therefrom to the coating agent may-range from 0.01 : 99.99 to 95 : 5, preferably from 0.1 : 99.9 to 50 : 50.

Then the mixture of the *Curculigo latifolia* fruits, processed *Curculigo latifolia* fruits or component containing curculin obtained therefrom with the coating agent is dissolved, dispersed or suspended in water or a salt to be used in the extraction.

The solution or suspension thus obtained is optionally homogenized and then dried by a common method, for example, spray-drying, freeze-drying or vacuum-drying. Similarly, grinding may be performed by a conventional method so as to give a grain size (100 to 200-mesh) commonly employed for chewing gum sweeteners.

In the present invention, a chewing gum containing the coated curculin composition obtained above is produced by the following method.

The content of the coated curculin composition in the chewing gum may vary depending on the kind of the *Curculigo latifolia* fruits, processed *Curculigo latifolia* fruits or component containing curculin obtained therefrom. In general, the content ranges from 0.1 to 70% by weight, preferably from 0.5 to 50% by weight, based on the total amount of the chewing gum. In terms of purified curculin, it is preferable that the content thereof in the chewing gum is at least 0.1 ppm, while a content exceeding 10,000 ppm is meaningless. It is preferable that the content ranges from 1 to 1,000 ppm.

The term "purified curculin" as used herein refers to a product obtained by effecting ion exchange chromatography after salting out. For example, a product obtained by purifying a precipitate, formed through salting out with ammonium sulfate, by CM-Sepharose ion exchange chromatography may be cited therefor.

In addition to the coated curculin composition, the chewing gum of the present invention may further contain components commonly employed in the art, for example, a gum base, sugars and flavors.

The chewing gum of the present invention is produced by processing the above-mentioned components in a conventional manner. The chewing gum thus produced is rolled, molded and packaged by common methods.

The above-mentioned coated curculin composition may be added to the chewing gum at any stage without restriction. It may be added together with sugars. However, it is preferable to add the coated curculin composition following the flavors in the final stage.

The chewing gum containing the above-mentioned coated curculin composition may be in the following forms. Namely, the coated curculin composition may be kneaded together with other chewing gum components. Alternately, the composition may be filled in the center of the chewing gum or the surface of the chewing gum may be coated with .the composition.

In the case of a chewing gum with a filling, the above-mentioned coated curculin composition, which is optionally formulated into jelly or jam, may be filled in the center.

The method for processing the coated curculin composition into jelly or jam is not particularly restricted. Thus, gelatinizers such as dextran, alginic acid, methylcellulose, gum arabic, traganth gum, carrageenan, tragacanth gum, carboxymethylcellulose, casein, gelatin or guar gum may be added to the coated curculin composition.

To further illustrate the present invention in greater detail, the following Examples will be given.

EXAMPLE 1

Step 1: preparation of coated curculin composition

To 1 kg of ground dry *Curculigo latifolia* fruits free from any seeds or peels was added15 l of water and the obtained mixture was stirred and centrifuged. To the solid matters remaining after removing the supernatant was added 20 l of a 0.5 M sodium chloride solution. The mixture was then stirred and centrifuged to thereby give a salt-extract containing curculin. This extract was desalted on a desalting device and 3 kg of reducing maltose syrup was added thereto. After dissolving under sufficient stirring, the obtained solution was freeze-dried and ground to thereby give a coated curculin composition of about 120 mesh (the content of purified curculin: 0.01% by weight).

Step 2: production of chewing gum base

The components as specified below were fed to a kneader and kneaded at 200° C. to thereby give a chewing gum base.

| Component | Content (wt. %) |
| --- | --- |
| natural resin | 25 |
| vinyl acetate resin | 22 |
| synthetic gum | 8 |
| ester gum | 10 |
| wax | 21 |
| emulsifier, fat | 4 |
| talc | 10. |

Step 3: production of chewing gum

By using the components as specified below, a chewing gum was produced by the following method (the content of purified curculin in chewing gum: 100 ppm).

| Component | Content (wt. %) |
| --- | --- |
| chewing gum base (obtained in Step 2) | 27 |
| sugar (finely ground) | 56 |
| malt syrup | 14 |
| glycerol | 1 |
| coated curculin composition (obtained in Step 1) | 1 |
| flavor (peppermint) | 1 |

Production method

In a bench kneader maintained at 55° C., the above-mentioned gum base and malt syrup were kneaded until a homogeneous mixture was obtained. Then ⅓ of the finely ground sugar was added thereto. After homogenizing, glycerol was added and then the residual sugar was successively added in portions, followed by sufficient kneading. Further, the coated curculin composition and the flavor were added thereto and the obtained mixture was kneaded for 2 minutes. The chewing gum thus obtained was rolled, molded, cut and packaged to thereby give a chewing gum product.

COMPARATIVE EXAMPLE 1

The procedure of the above Example 1 was repeated except that the coated curculin composition was replaced with sugar. Thus a chewing gum product was obtained.

COMPARATIVE EXAMPLE 2

The procedure of the above Example 1 was repeated except that the coated curculin composition was replaced with 1% by weight of a dry *Curculigo latifolia* fruit powder. Thus a chewing gum product was obtained (the content of purified curculin in chewing gum: 100 ppm). 1% by weight in terms of purified curculin is contained in the dry fruit powder.

EXAMPLE 2

Step 1: preparation of coated curculin composition

To 10 kg of fresh *Curculigo latifolia* fruits was added 10 l of water and the obtained mixture was stirred and centrifuged. To the solid matters remaining after removing the supernatant was added 10 l of a 0.3 M potassium chloride solution. The mixture was then stirred and centrifuged to thereby give a salt-extract containing curculin. This extract was desalted on a desalting device and 5 kg of casein and 0.1 kg of gelatin were added thereto. After dissolving under sufficient stirring, the obtained solution was freeze-dried and ground to thereby give a coated curculin composition of about 200 mesh (the content of purified curculin: 0.01% by weight).

Step 2: production of chewing gum base

The components as specified below were fed to a kneader and kneaded at 150° C to thereby give a chewing gum base.

| Component | Content (wt. %) |
| --- | --- |
| vinyl acetate resin | 32 |
| synthetic rubber | 10 |
| ester gum | 15 |
| wax | 10 |
| emulsifier, fat | 15 |
| calcium carbonate | 15. |

Step 3: production of chewing gum

By using the components as specified below, a chewing gum was produced by the following method (the content of purified curculin in chewing gum: 500 ppm).

| Component | Content (wt. %) |
| --- | --- |
| chewing gum base (obtained in Step 2) | 28 |
| sugar (finely ground) | 58 |
| malt syrup | 7 |
| glycerol | 1 |
| coated curculin composition (obtained in Step 1) | 5 |
| flavor (orange) | 1 |

Production method

In a bench kneader maintained at 55° C., the above-mentioned gum base and malt syrup were kneaded until a homogeneous mixture was obtained. Then ⅓ of the finely ground sugar was added thereto. After homogenizing, glycerol was added and then the residual sugar was successively added in portions, followed by sufficient kneading. Then flavor was added and the obtained mixture was kneaded for 2 minutes to thereby give a chewing gum. Separately, the coated curculin composition prepared in the above Step 1 to give a center filling. By using this center filling, a chewing gum with a filling was produced in a conventional manner. After packaging, a chewing gum product was obtained.

COMPARATIVE EXAMPLE 3

The procedure of the above Example 2 was repeated except that the coated curculin composition was replaced with sugar. Thus a chewing gum product was obtained.

COMPARATIVE EXAMPLE 4

The procedure of the above Example 2 was repeated except that the coated curculin composition was replaced with 5% by weight of a dry *Curculigo latifolia* fruit powder. Thus a chewing gum product was obtained (the content of purified curculin in chewing gum:

500 ppm). 1% by weight in terms of purified curculin is contained in the dry fruit powder.

TEST EXAMPLE 1

The retention of the sweetness and flavor of the chewing gums produced in the above Example 1 and Comparative Examples 1 and 2, and the taste-modification effects (sweetness) of these products on a 0.1 M citric acid solution taken after Chewing these chewing gums were evaluated by 10 panelists. Table 1 shows the results.

TABLE 1

Taste-modification effects of chewing gums of Example 1 and Comparative Examples 1 and 2

| | Retention of sweetness and flavor (min)/(No. of panelists) | | | | | | Sweetness of 0.1 M citric acid solution after chewing* |
|---|---|---|---|---|---|---|---|
| | <2 | 2-4 | 5-6 | 7-8 | 9-10 | >10 | |
| Ex. 1 | | | | | | 10 | +++ |
| Comp. Ex. 1 | 9 | 1 | | | | | — |
| Comp. Ex. 2 | | 2 | 5 | 3 | | | ±~+ |

*+++: considerably sweet, ±~+: somewhat sweet, —: not sweet at all.

TEST EXAMPLE 2

The retention of the sweetness and flavor of the chewing gums produced in the above Example 2 and Comparative Examples 3 and 4, and the taste-modification effects (sweetness) of these products on beer taken after chewing these chewing gums were evaluated by 10 panelists. Table 2 shows the results.

TABLE 2

Taste-modification effects of chewing gums of Example 2 and Comparative Examples 3 and 4

| | Retention of sweetness and flavor (min)/(No. of panelists) | | | | | | Sweetness of beer after chewing* |
|---|---|---|---|---|---|---|---|
| | <2 | 2-4 | 4-6 | 6-8 | 8-10 | >10 | |
| Ex. 2 | | | | | | 10 | +++ |
| Comp. Ex. 3 | 10 | | | | | | — |
| Comp. Ex. 4 | | 5 | 3 | 2 | | | ±~+ |

*+++: considerably sweet, ±~+: somewhat sweet, —: not sweet at all.

What is claimed is:

1. A chewing gum containing a coating material which is prepared by coating *Curculigo latifolia* fruits, processed *Curculigo latifolia* fruits or a component containing curculin obtained therefrom with a coating agent at a temperature of 60° C. or below; and wherein the grain size of said coated material is 100 to 200 mesh, the content of said coated material ranges from 0.1 to 70% by weight based on the total amount of the chewing gum, and the content thereof in terms of purified curculin is 0.1 to 1,000 ppm;

said coating agent is selected from the group consisting of reducing maltose syrup, reducing starch decomposition product, lactose, oligo-saccharides, dextrin, branched dextrin, whey protein, vegetable fats and oils, animal fats and oils, gelatin, guar gum, cyclodextrin, chitin, chitosan soluble starch, gum arabic, pectin and microcrystalline cellulose; and the weight ratio of said *Curculigo latifolia* fruits, processed *Curculigo latifolia* fruits or a component containing curculin obtained therefrom to said coating agent ranges from 0.01 : 99.99 to 95 : 5.

* * * * *